J. PILKINGTON.
Heaters and Feeders for Steam-Boilers.
No. 140,301.  Patented June 24, 1873.
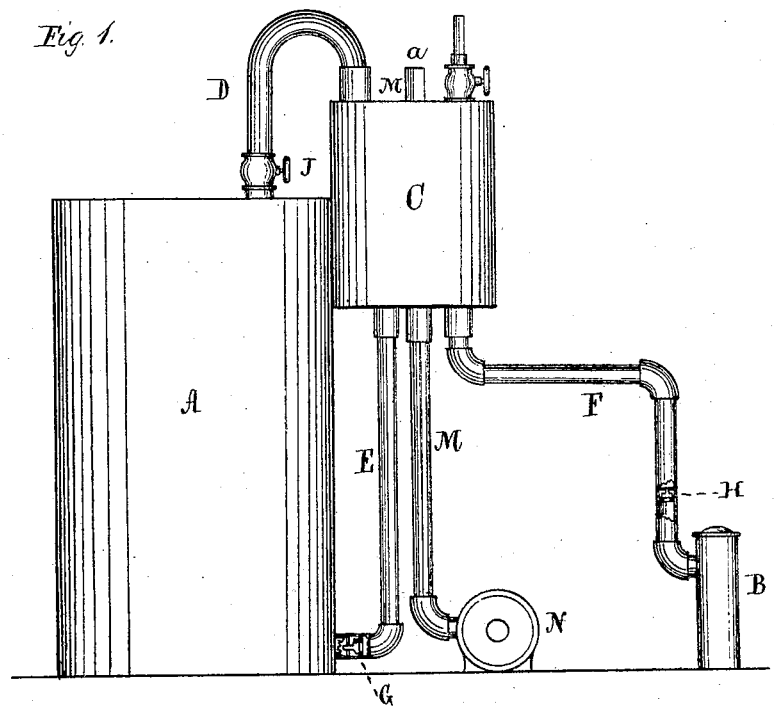
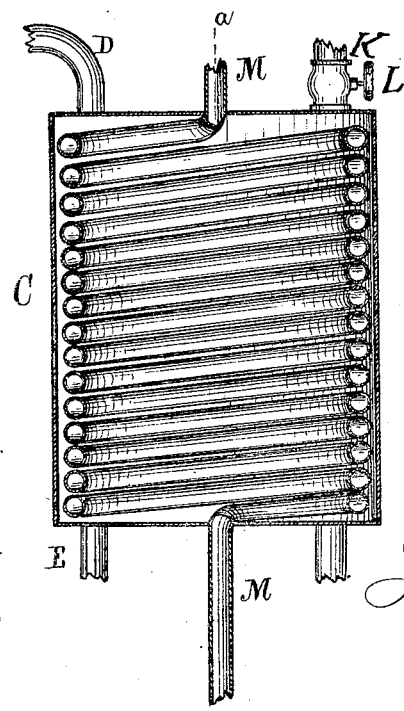
Witnesses:
Jacob E. Schiedt
Millard F. Walton
Inventor:
Joseph Pilkington
by
John A. Wiedersheim
Attys

UNITED STATES PATENT OFFICE.

JOSEPH PILKINGTON, OF PHILADELPHIA, PENNSYLVANIA, ASSIGNOR OF THREE-FOURTHS HIS RIGHT TO J. H. BILLINGTON & COMPANY, OF SAME PLACE.

IMPROVEMENT IN HEATERS AND FEEDERS FOR STEAM-BOILERS.

Specification forming part of Letters Patent No. 140,301, dated June 24, 1873; application filed March 27, 1873.

*To all whom it may concern:*

Be it known that I, JOSEPH PILKINGTON, of the city and county of Philadelphia and State of Pennsylvania, have invented a new and useful Improvement in Injectors or Feed-Water Apparatus; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a side elevation of the device embodying my invention. Fig. 2 is a central vertical section of a portion thereof.

Similar letters of reference indicate corresponding parts in the several figures.

This invention consists in a novel arrangement of water-receiver, connecting-pipes, check-valves, and heating-pipe, in combination with the generator and water-supply, for the purposes of a feed-water apparatus.

Referring to the drawings, A represents a steam-generator, and B a hydrant, plug, tank, or other water-supply. C represents a tank or drum for the reception of water, and is interposed between the generator A, and place of supply B, at an elevation relatively to the water-level of the generator. The generator and tank communicate with each other by a steam-pipe, D, and likewise at another point by a water-pipe, E. Water is supplied to the tank by a pipe, F, leading from the supply B. A check-valve, G, is arranged with the pipe E, between the tank and the generator, and opens toward the generator. A check-valve, H, is arranged with the pipe F between the tank and the supply B, and opens toward the tank. A valve, J, is properly located with the pipe D, for admitting and cutting off steam to and from the tank C.

The operation is as follows: Water is turned on from the supply B and its pressure opens the check-valve H. When the tank is full or sufficiently supplied, and it is desired to feed the generator, the valve J is opened and steam from the generator enters the tank C and presses on the water. This pressure causes the check-valve H to close, and stops the flow of water to the tank. At the same time the pressure forces open the check-valve G, (which has been kept closed by the pressure of the generator from below,) and at once water flows through pipe E into the generator. When the latter is supplied, steam is shut off by the valve J. Then the check-valve G closes and the check-valve H opens. Water again flows into the tank and supplies the same, and the operation of feeding the generator continues, as has been stated. When water is flowing into the tank the air in the latter escapes through a pipe, K, furnished with a stop-cock or valve, L, which is opened for such escape. When the steam is admitted into the tank the stop-cock or valve L must be closed. When the tank is full of water, and the latter is not immediately required for use, the supply at B is shut off.

M represents a pipe for conveying and utilizing the exhaust steam from the engine (whose cylinder is shown at N) for warming the water in the tank or drum C. The pipe passes in a coil or other form through the water in the tank or drum, and continues beyond the latter, as at a, whereby the exhaust steam leaving the engine, escapes at a, and in its passage heats the pipe M, and consequently imparts its heat or warmth to the water that enters the generator.

Compressed air may, however, be employed instead of steam as a pressure on the water, but the operation of the device will be the same as that stated.

Having thus described my invention, what I claim as new and desire to secure by Letters Patent, is—

The combination of the water-supply B, tank C, heating-pipe M, conducting-pipes D E F, and check-valves G H, all constructed and arranged to operate in connection with the generator A, in the manner and for the purposes herein set forth.

The above signed by me this 20th day of March, 1873.

JOSEPH PILKINGTON.

Witnesses:
JOHN A. WIEDERSHEIM.
MILLARD F. WALTON.